(12) United States Patent
Riha (10) Patent No.: US 6,726,240 B2
(45) Date of Patent: Apr. 27, 2004

(54) AIRBAG DOOR WITH AN ELECTROMAGNETIC FIELD

(75) Inventor: Keith A. Riha, Rochester, MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 10/221,226

(22) PCT Filed: Mar. 7, 2001

(86) PCT No.: PCT/US01/07314

§ 371 (c)(1),
(2), (4) Date: Mar. 13, 2003

(87) PCT Pub. No.: WO01/66386

PCT Pub. Date: Sep. 13, 2001

(65) Prior Publication Data

US 2003/0205886 A1 Nov. 6, 2003

Related U.S. Application Data

(60) Provisional application No. 60/187,529, filed on Mar. 7, 2000.

(51) Int. Cl.⁷ .................................................. B60R 22/16
(52) U.S. Cl. ..................................... 280/728.3; 280/735
(58) Field of Search .................................. 280/735, 734, 280/728.1, 728.3

(56) References Cited

U.S. PATENT DOCUMENTS

| | | | |
|---|---|---|---|
| 5,288,103 A | 2/1994 | Parker et al. | 280/728.1 |
| 5,525,843 A | 6/1996 | Howing | 307/9.1 |
| 5,770,997 A | 6/1998 | Kleinberg et al. | 340/438 |
| 5,863,064 A | 1/1999 | Rheinlander et al. | 280/732 |

*Primary Examiner*—Eric Culbreth
(74) *Attorney, Agent, or Firm*—Grossman, Tucker, Perreault & Pfleger, PLLC (57) ABSTRACT

An airbag deployment safety device (25) is provided comprising a first conductive path (48a) for receiving an input signal, a second conductive path (48b) for receiving an induced signal through electromagnetic coupling of the first conductive path (48a) and the second conductive path (48b), and a processor circuit (79) configured to control deployment of the airbag (25a) in response to a comparison of the induced signal to a predetermined path.

26 Claims, 7 Drawing Sheets

AIRBAG DOOR WITH AN ELECTROMAGNETIC FIELD

CROSS REFERENCE TO RELATED APPLICATIONS

This application is a National Stage of International Application No. PCT/US01/07314 filed Mar. 7, 2001, which designated the United States, (International Publication No.: WO 01/66386) and claims benefit of U.S. provisional patent application Ser. No. 60/187,529 filed on Mar. 7, 2000.

This invention relates generally to airbag doors and, more particularly, to airbag doors which make use of an electromagnetic field thereon functioning as a safety device in controlling airbag deployment.

Whereas thousands of lives have been saved by airbags, a large number of vehicle occupants have also been injured, some seriously, by deploying airbags. For a variety of reasons vehicle occupants may be too close to the airbag before it deploys and can be seriously injured or killed as a result of the deployment thereof.

In response, so called "out-of-position" occupant sensors have been developed is to determine the location of the head and/or chest of the vehicle occupant relative to the airbag based on the presumption it is the impact of either the head or chest with the deploying airbag which can result in serious injuries.

While the impact of a vehicle occupant's head or chest with a deploying airbag may result in serious injuries, equally serious injuries may result from a vehicle occupant's contact with the airbag deployment door or objects located thereon which may be transformed into projectiles upon deployment. In such an instance, the so called "out-of-position" occupant sensors which sense the location of the vehicle occupant's head and/or chest may offer no benefit to a correctly positioned occupant.

For example, some vehicle occupants while in proper position for airbag deployment, rest their feet on the instrument panel, often directly on the airbag deployment door. Still other vehicle occupants, also in proper position for airbag deployment, place objects such as books, coffee cups, pens, sunglasses, cigarettes, keys, documents, soda cans, palm computers, portable CD-players, portable phones, radar detectors and other similar items directly on the airbag deployment door.

In light of the forgoing disadvantages of out-of-position sensors, what is needed is an airbag deployment safety device which can detect foreign objects (i.e. items not provided by the vehicle manufacturer at the time of vehicle manufacture) located on and around an air bag deployment door and, in response to the presence of such objects, temporarily disarm the airbag system. Then, once the objects are removed, the airbag deployment safety device can rearm the airbag system, making it again ready for use.

An airbag deployment safety device is provided comprising a first conductive path for receiving an input signal, a second conductive path for receiving an induced signal through electromagnetic coupling of the first conductive path and the second conductive path, and a processor circuit configured to control deployment of the airbag in response to a comparison of the induced signal to a predetermined signal. By the term "control deployment" of the airbag, it is meant that the processor circuit will either permit or prevent airbag deployment when otherwise initiated by an external triggering event.

According to another aspect of the invention, a method of triggering the deployment of an airbag is provided comprising receiving an input signal to a first conductive path, receiving an induced signal to a second conductive path through electromagnetic coupling of the first conductive path and the second conductive path, comparing the induced signal with a predetermined signal, and controlling deployment of the airbag in response to the comparison of the induced signal to the predetermined signal.

According to another aspect of the invention, in the method of controlling the deployment of an airbag, the predetermined signal comprises a range of predetermined signals having an upper limit and a lower limit and the step of controlling deployment of the airbag in response to the comparison of the induced signal to the predetermined signal further comprises permitting deployment of the airbag in response to the comparison of the induced signal to the predetermined signal when the induced signal is within the range of predetermined signals and not permitting deployment of the airbag in response to the comparison of the induced signal to the predetermined signal when the induced signal is outside the range of predetermined signals.

According to another aspect of the invention, a trim panel for a motor vehicle is provided comprising a first conductive path for receiving an input signal, a second conductive path for receiving an induced signal through electromagnetic coupling of the first conductive path and the second conductive path, and an airbag deployment door.

According to another aspect of the invention, an airbag deployment door is provided comprising at least a portion of one of a first conductive path and a second conductive path, the first conductive path for receiving an input signal and the second conductive path for receiving an induced signal through electromagnetic coupling of the first conductive path and the second conductive path.

According to another aspect of the invention, an airbag deployment door having an outer surface is provided, an electromagnetic field overlying at least a portion of the outer surface of the airbag deployment door, the electromagnetic field configured to trigger deployment of an airbag.

To better understand and appreciate the invention, refer to the following detailed description in connection with the accompanying drawings.

Figure 1:
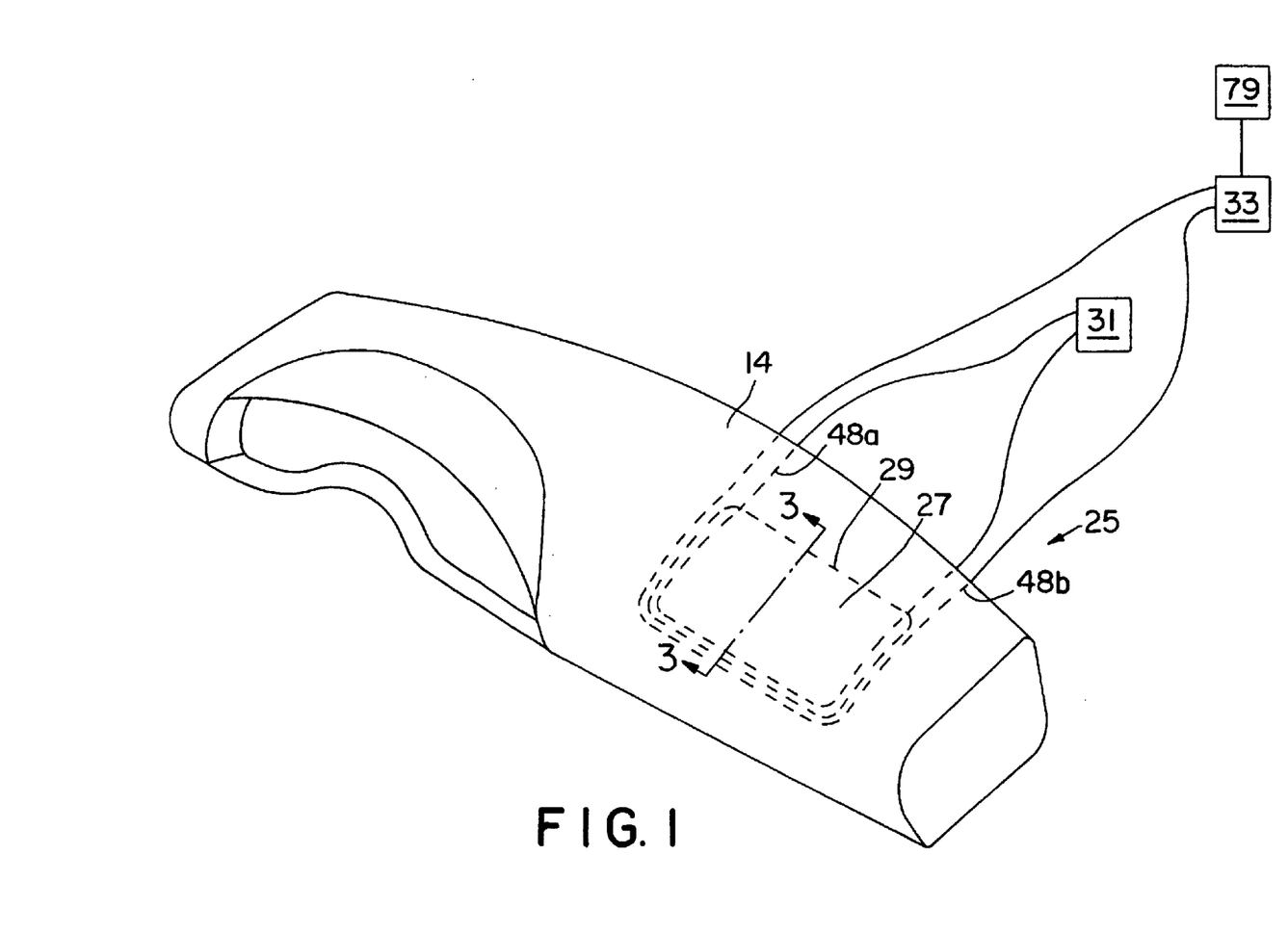
FIG. 1 is a perspective view of an airbag door system according to a first embodiment of the present invention.
Figure 3:
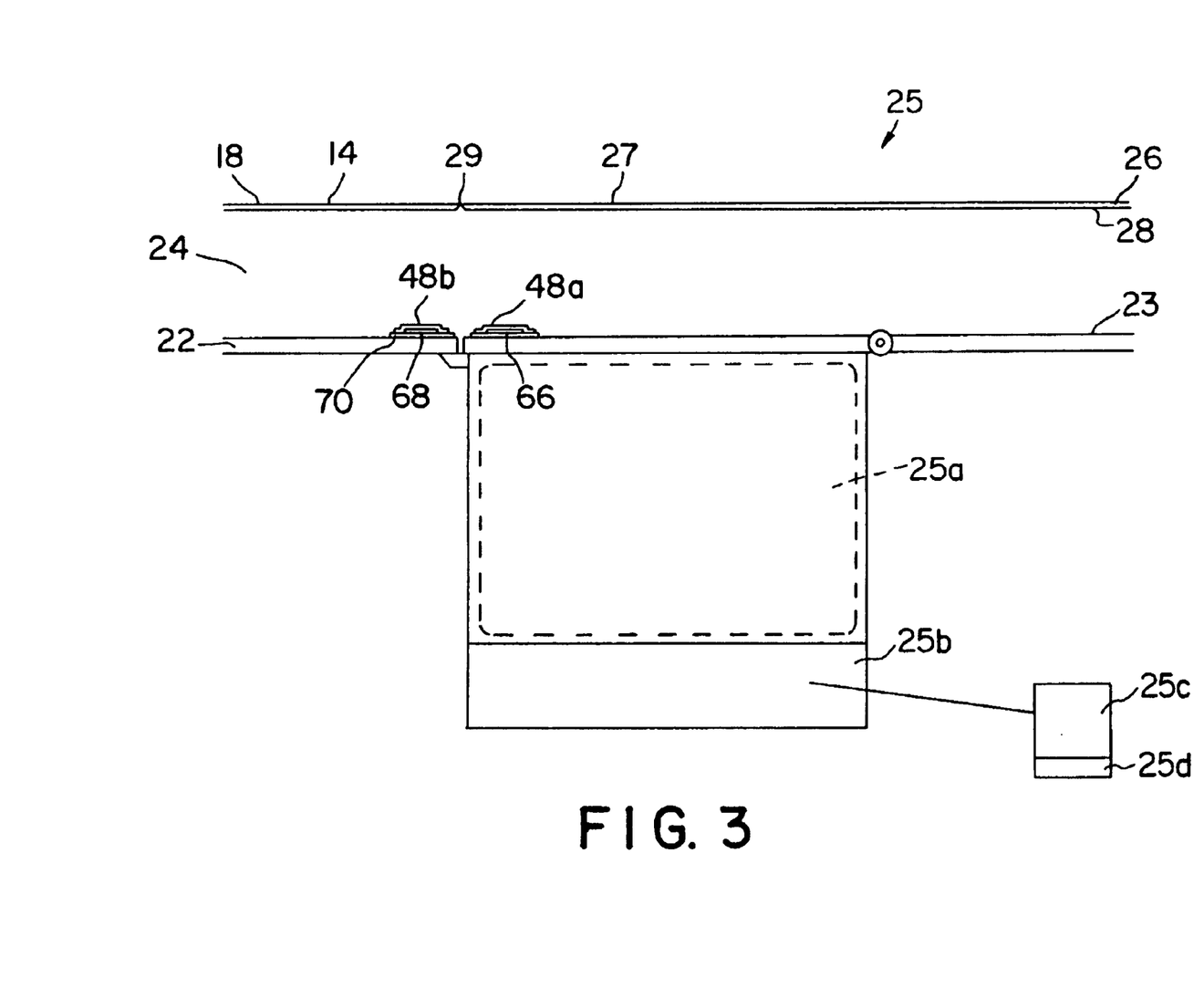
FIG. 3 is a cross sectional view of the airbag door system of FIG. 1 taken along section line 3—3.

An exemplary airbag door system is shown at 25 in FIG. 1 comprising an airbag door 27 and trim panel 14. As shown in FIG. 3, airbag door system 25 also comprises an air bag 25$a$ that is inflated by a gas generator 25$b$ in response to a signal from a controller 25$c$ of a collision sensing device 25$d$ as is well known in the art. While illustrated with an instrument panel, the airbag door system 25 can be employed as part of any trim panel in the vehicle. For example, it can be part of side panels (e.g. door panels, quarter panels), headliners, overhead consoles, floor consoles, package trays, parcel shelves, close-out panels, seats, pillars, or any other part of a vehicle interior.

As shown in FIG. 3, the airbag door system 25 comprises a substrate layer 22, a foam layer 24, and a skin layer 26. The outer surface 18 of skin layer 26 is the surface generally viewed by vehicle occupants. Generally, foam layer 24 is bonded directly to outer surface 23 of substrate layer 22 and to inner surface 28 of skin layer 26.

Preferably, the outer surface 18 of skin layer 26 of trim panel. 14 is continuous across the boundary 29 defining airbag door 27. Also preferably, airbag door 27 is concealed from view by vehicle occupants prior to deployment by the non-existence of any definitive seam, styling line, gap, or other interruptions between the outer surface 18 of the airbag door 27 and trim panel 14 across boundary 29 which would indicate the airbag door's presence. It is recognized that where airbag door 27 is concealed prior to airbag deployment, the boundary 29 defining airbag door 27 from trim panel 14 may be difficult to ascertain, thus necessitating airbag deployment to establish the boundary 29 as the location of separation between airbag door 27 and trim panel 14 upon airbag deployment.

As best shown in FIG. 3, a first conductor 66 of wire 48a is preferably located within the confines of airbag door 27 while a second conductor 68 of wire 48b is preferably located within the confines of trim panel 14. However, alternatively, both first conductor 66 of wire 48a and second conductor 68 of wire 48b may be located within the confines of airbag door 27 or trim panel 14.

As best shown in FIG. 1, preferably both wires 48a and 48b (and thus first conductor 66 and second conductor 68) remain laterally displaced and substantially parallel to one another along at least a portion of their respective lengths. Also as shown, at least a portion of first conductor 66 of wire 48a and/or second conductor 68 of wire 48b are adjacent boundary 29 defining airbag door 27. Also as shown, boundary 29 defining airbag door 27 exists between and separates at least a portion of first conductor 66 of wire 48a from second conductor 68 of wire 48b.

First conductor 66 and second conductor 68 comprise two electrically conductive circuits. More particularly, as shown in FIG. 1, first conductor 66 and second conductor 68 comprise input circuit 31 and output circuit 33, respectively. However, the relative location of each circuit is interchangeable and may be reversed. In other words, first conductor 66 may comprise output circuit 33 and second conductor 68 may comprise input circuit 31.

Input circuit 31 is provided with energy from a power source and, more preferably, a device providing alternating or pulsating current and, even more preferably, an oscillator. Input circuit 31 and output circuit 33 are electromagnetically coupled (i.e. a coupling which exists between circuits or conductors when they are mutually affected by the same electromagnetic field) prior to airbag deployment. More specifically, alternating current created in input circuit 31 generates a corresponding electromagnetic field around input circuit 31 in a manner known in the art.

As a result of being electromagnetically coupled, the electromagnetic field generated around input circuit 31 induces an electric current in output circuit 33. Data concerning the induced current (e.g. amperage) in output circuit 33 from input circuit 31 may be sensed by a microprocessor 79. In order to establish initial threshold conditions for airbag deployment, data sensed by microprocessor 79 concerning the induced current in output circuit 31 is preferably collected when airbag system 25 and electromagnetically coupled input circuit 31 and output circuit 33 are in a steady state (i.e. the condition in which circuit values remain essentially constant, after initial transients or fluctuating conditions have disappeared). Once the initial data concerning the induced current is collected, the data may be then preferably analyzed to establish a reference residual electric current with upper and lower threshold limits when airbag door system 25 may be safely deployed.

In operation, generally any physical object intruding into the electromagnetic field encompassing input circuit 31 and output circuit 33 will change the magnitude of the electromagnetic coupling and thus the induced current in output circuit 33 from input circuit 31. As a result, when the changed induced current is measured outside the previously established upper and lower threshold limits for the reference induced current, airbag door system 25 will not deploy. Thus, for example, when installed in a vehicle airbag door system 25 will not deploy when a vehicle occupant or object (e.g. child, car seat, grocery bag) has intruded into the electromagnetic field generated around input circuit 31, resulting in a change in the electromagnetic coupling with output circuit 33, and a corresponding change in the residual electric current measured outside the previously established upper and lower threshold limits of the reference residual electric current.

In addition to the vehicle use, the above structure may be used as an inspection device in the manufacturing facility for airbag door system 25 to reduce, and preferably eliminate, the possibility of unintended manufacturing items (e.g. trim waste, rivet shanks, loose screws, etc.) from intruding into the electromagnetic field during manufacture and remaining undiscovered, thus posing a risk of becoming projectiles during airbag deployment.

While the above embodiment provides an electromagnetic field which overlies at least a portion of the outer surface 18 of airbag door 27, and more particularly an electromagnetic field adjacent boundary 29 defining airbag door 27, other variations may provide an electromagnetic field overlying an even greater portion (e.g. greater than 50%) of airbag door 27.

Figure 2:
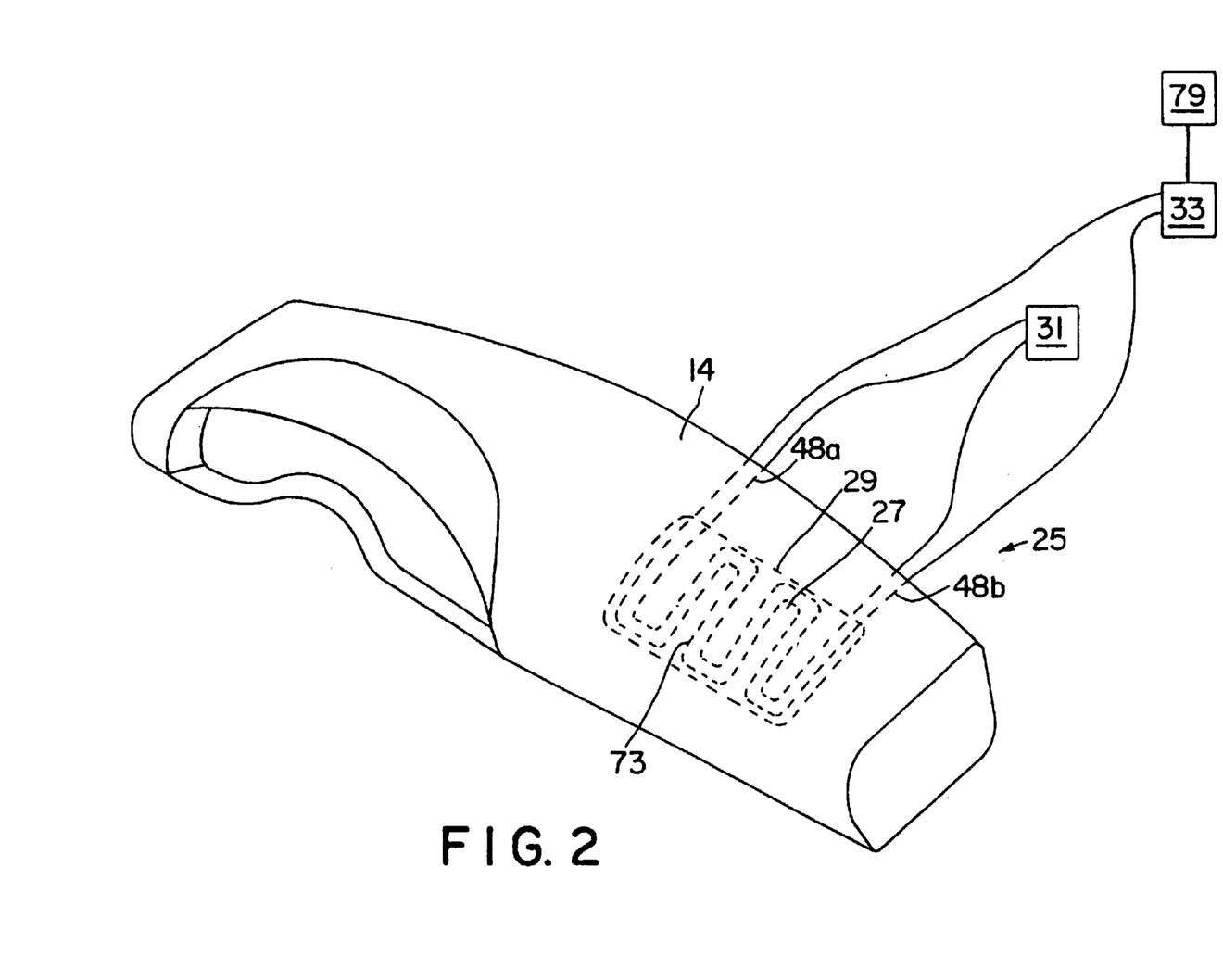
FIG. 2 is a perspective view of an airbag door system according to a second embodiment of the present invention.

In a second embodiment as illustrated in FIG. 2, where both first conductor 66 of wire 48a and second conductor 68 of wire 48b are located within airbag door 27, the conductors may comprise a substantially serpentine pattern 73 or other pattern which covers the outer surface 18 of airbag door 27 such that the electromagnetic field generated by input circuit 31 substantially overlies, and preferably completely overlies, the outer surface 18 of airbag door 27. In this manner, generally any physical object intruding into the electromagnetic field overlying outer surface 18 of skin layer 26 will be detected as described above and, under certain conditions, airbag door system 25 will not deploy.

As can best be seen from FIG. 3, conductors 66 and 68 preferably are rectangular. More particularly, conductors 66 and 68 comprise an electrically conductive metal, such as copper or similar metal, in the form of a thin foil, which are preferably insulated by insulator 70. The use of one or more conductors with a rectangular shape insulated by an insulator may be referred to as "flat" wire. The use of flat wire, as opposed to traditional round wire with a round conductor, is preferred for attachment to the outer surface 23 of substrate 22. However, both flat and round wire may be used. More particularly, the flat wire 48a, 48b may take the form of a flexible printed circuit (FPC).

Preferably wires 48a, 48b are at least partially surrounded by and, more preferably, at least partially embedded in the foam layer 24. Prior to being at least partially surrounded and embedded by the foam layer 24, wires 48a, 48b may also be joined to the inner surface 28 of skin layer 26 or to the outer surface 23 of substrate layer 22, but it is recognized that wires 48a, 48b may be positioned at any location therebetween. More preferably, wires 48a, 48b are joined to the outer surface 23 of substrate layer 22 by a double-sided pressure sensitive adhesive tape located therebetween or with mechanical fasteners (e.g. clips, screws, etc.).

In order to at least partially surround and embed wires 48a, 48b in foam layer 24, the wires 48a, 48b are preferably placed between the inner surface 28 of the skin layer 26 and the outer surface 23 of substrate layer 22 prior to the introduction of the foam layer 24. Then, foam layer 24 is preferably formed by introducing a foam, or more preferably, a foam precursor material between the inner surface 28 of skin layer 26 and the outer surface 23 of substrate layer 22. Preferably, the foam precursor is a urethane foam precursor which is introduced using a reaction injection molding process as known in the art. After the urethane foam precursor is introduced, the reactive constituents, a polyol and an isocyanate, begin to react, and the subsequently created foam material formed between the inner surface 28 of skin layer 26 and the outer surface 23 of substrate layer 22 bonds skin layer 26 to substrate layer 22 while at the same time flowing around and preferably bonding to the exposed surfaces of wires 48a, 48b.

Alternatively, wires 48a, 48b may be located in the skin layer 26. For example, the wires 48a, 48b may be at least partially surrounded by and, more preferably, at least partially embedded in the skin layer 26. Also, in the various embodiments, many types of adhesives, including urethanes, etc., may be used to bond wires 48a, 48b to skin layer 26 or substrate 22 of trim panel 14. The adhesives may be applied in any one of a number of forms to include pressure-sensitive backings, hot melts and spray coatings.

While skin layer 26 is preferably formed by casting, skin layer 26 may also be formed by spray coating, blow molding, or thermoformed sheet and then incorporated into the subsequent foam forming process identified above. With regards to more specific skin materials, skin layer 26 may comprise thermoplastic or thermoset polymers. The group of thermoplastic polymers includes, but is not limited to, polyvinyl chloride (PVC), thermoplastic urethane (TPU), and thermoplastic olefin (TPO). The group of thermoset polymers includes, but is not limited to, polyurethane.

While foam layer 24 is preferably joined to skin layer 26 and substrate layer 22 simultaneously by the reaction injection molding process, foam layer 24 may also be joined to skin layer 26 prior to introduction of substrate layer 22 rather than simultaneously as identified above. For example, skin layer 26 and foam layer 24 may be provided as a multi-layer sheet which is subsequently heated and vacuum formed over substrate layer 22.

Figure 4:
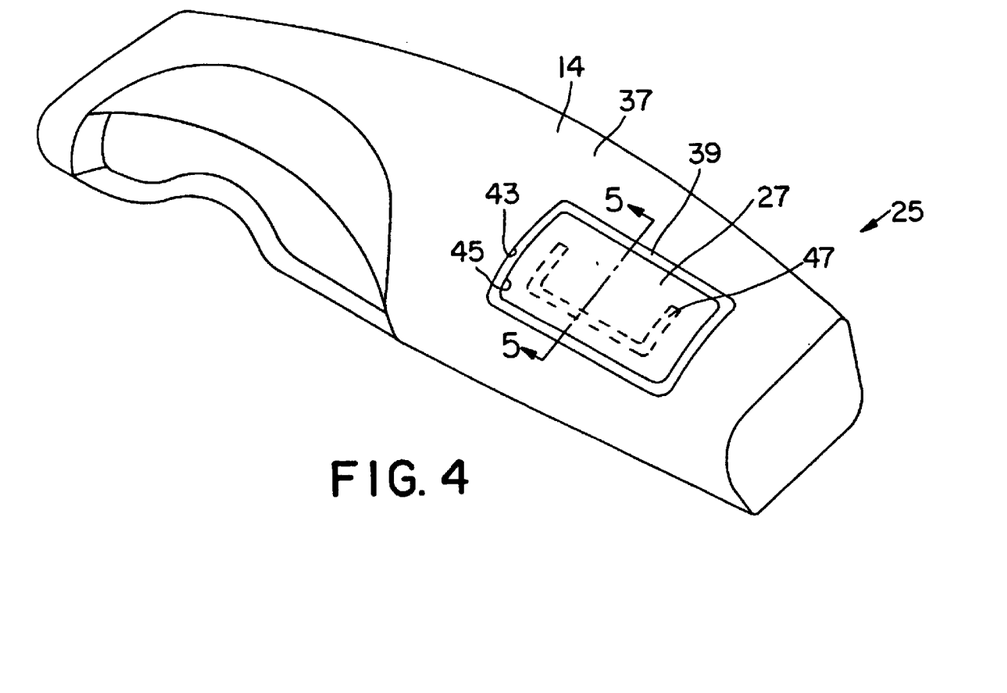
FIG. 4 is a perspective view of an airbag door system according to a third embodiment of the present invention.
Figure 5:
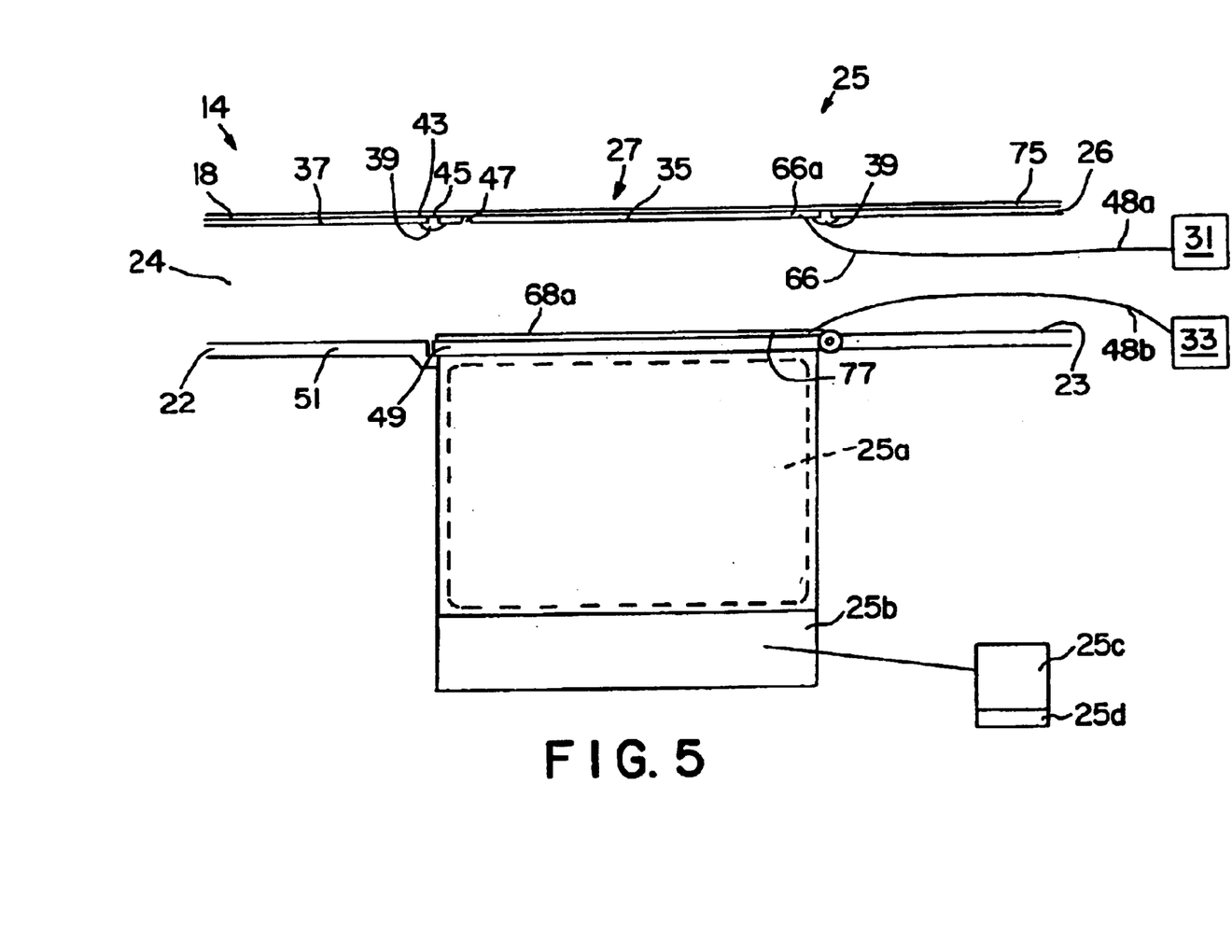
FIG. 5 is a cross sectional view of the airbag door system of FIG. 4 taken along section line 5—5.

In a third embodiment of the invention as shown in FIGS. 4 and 5, skin layer 26 comprises an airbag door skin portion 35 and a trim panel skin portion 37. Airbag door skin portion 35 comprises an electrically conductive member and more preferably an electrically conductive polymer. In this manner, airbag door skin portion 35 functions as a first conductor 66a and preferably, when connected to first conductor 66 of wire 48a, comprises an input circuit 31 which functions as discussed in the first embodiment. As for trim panel skin portion 37, it preferably comprises a polymer with a lower electrical conductivity than the electrically conductive member of the airbag door skin to insulate the electrically conductive member from short circuit.

With respect to preferred electrically conductive polymers, such polymers include, but are not limited to polymers that are electrically conductive, e.g. those polymers that contain extended sequences of conjugation, resulting in optimum resonance, which in the presence of metallic or metalloid ions, provide conductivity. Alternatively, electrically conductive polymers herein include polymers containing appropriate loadings of electrical conductor additive, such as metal powders and/or metallic fibers. Along such lines, carbon, silver, graphite, mercury, aluminum, and copper filler are herein contemplated.

Also as part of the third embodiment, substrate layer 22 comprises an airbag door substrate portion 49 and a trim panel substrate portion 51. Preferably airbag door substrate portion 49 comprises an electrically conductive member and more preferably an electrically conductive metal coating or foil 77 applied to outer surface 23 of substrate 49. Preferably, the substrate layer 22 to which the electrically conductive member is attached comprises a polymer with a lower electrical conductivity than the electrically conductive member to insulate the electrically conductive member from short circuit. In this manner, airbag door substrate portion 49 functions as a second conductor 68a and preferably, when connected to second conductor 68 of wire 48b, comprises an output circuit 33 which functions as discussed in the first embodiment. However, alternatively, any vehicle member comprising an electrically conductive circuit displaced from and electrically coupled with circuit 31 of airbag door skin portion 35 may be acceptable as a output circuit 33.

The two skin portions 35, 37 may be joined together by a plastic bond 39. The bonding 39 may be formed by partially or completely overlapping and melt fusing the skin portions 35, 37 together, or may comprise a separate material joined to each skin portion 35, 37 as explained in greater detail below.

The airbag door skin and trim panel portions 35, 37 may be formed simultaneously in a single forming process, such as casting using an electroformed shell tool in a manner known in the art. As seen in FIGS. 4 and 5, the airbag door skin portion 35 and trim panel portion 37 are preferably cast with closely adjacent outer and inner edges 45 and 43, respectively, for the formation of the bond 39. The outer edge 45 defines the periphery of the air bag door skin portion 35 and the inner edge 43 defines the periphery of trim panel skin portion 37 adjacent the air bag door skin portion 35 with bond 39 therebetween. An example of a similar process of manufacture is disclosed in U.S. Pat. No. 5,863,064 assigned to the assignee of the present invention and incorporated by reference.

Airbag door skin portion 35 may also include a tear seam 47 included therein in a manner known in the art to help facilitate airbag deployment. However, while bond 39 and tear seam 47 are shown as separate features, in other embodiments at least a portion of bond 39 and tear seam 47 may be one and the same. According to such an alternative embodiment, the composition of the bonding material used for the bond 39 that joins skin portions 35 and 37 would be of a relatively weaker (e.g. lower tensile strength) material. An example of this weaker material is disclosed in U.S. Pat. No. 5,288,103 assigned to the assignee of the present invention and incorporated by reference. The location of bond 39 and/or tear seam 47 may be concealed from view by vehicle occupants by applying an outer coating 75 of paint to the outer surface 18 of skin layer 26.

Figure 6:
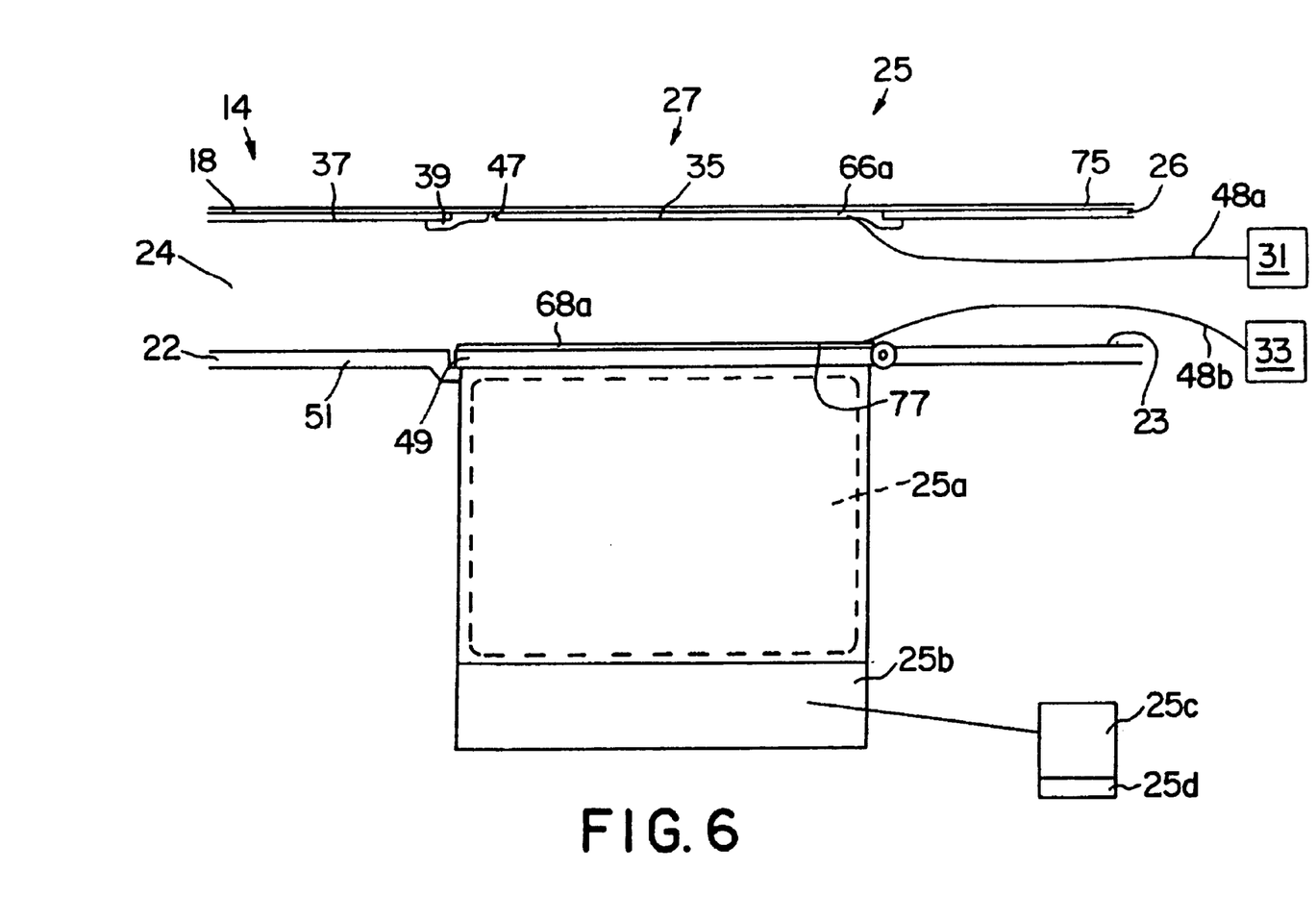
FIG. 6 is a cross sectional view of an airbag door system according to a fourth embodiment of the present invention taken along section line 5—5 of FIG. 4.

In a fourth embodiment of the invention as shown in FIG. 6, a separate material for bond 39 is not required. In this embodiment, instead of forming airbag door skin portion 35 and trim panel skin portion 37 simultaneously, airbag door skin portion 35 and trim panel skin portion 37 are formed sequentially. For example, trim panel skin portion 37 may be formed, such as by casting, before forming the air bag door skin portion 35. Then, in a subsequent forming operation, airbag door skin portion 35 may be formed, such as by casting. During the subsequent forming operation, trim panel skin portion 37 may be either partially or completely underlined with material from the subsequent forming cycle.

Figure 7:
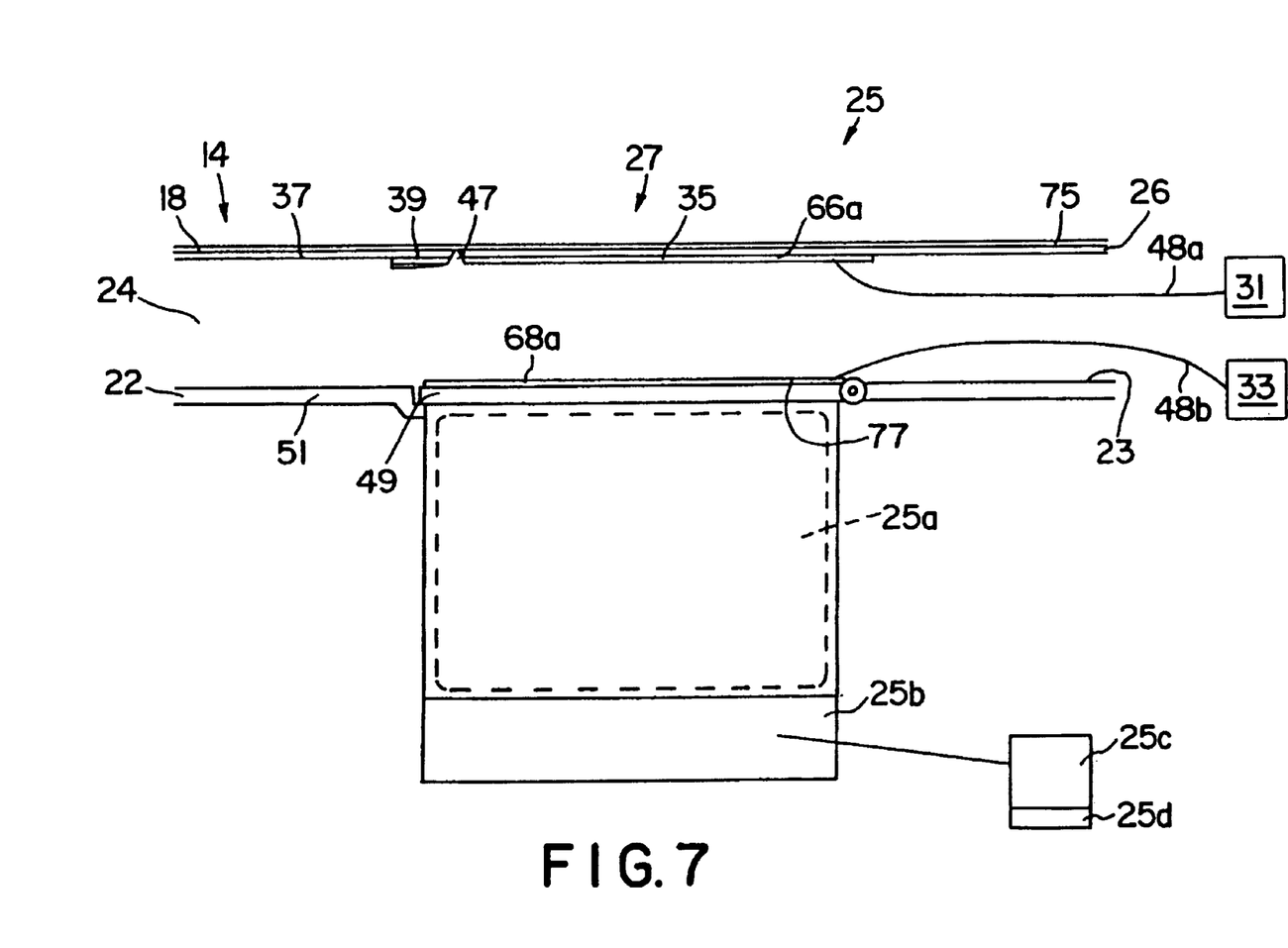
FIG. 7 is a cross sectional view of an airbag door system according to a fifth embodiment of the present invention taken along section line 5—5 of FIG. 4.

In a fifth embodiment of the invention as shown in FIG. 7, the higher electrically conductive member used for airbag door skin portion 35 may be covered from view and touch from vehicle occupants by the polymer used for trim panel skin portion 37. According to this embodiment, airbag door skin portion 35 and trim panel skin portion 37 are both first formed as a first skin layer, preferably from casting, the polymer with the lower electrical conductivity. Then, subsequent to the formation of the first skin layer, at least a portion of airbag door skin portion 35 of the first skin layer is underlined with a higher electrically conductive polymer. In this manner the lower electrically conductive polymer functions as an insulator relative to the higher electrically conductive polymer, both around and overlying.

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims herein.

I claim:

1. An airbag deployment safety device comprising:
   a first conductive path for receiving an input signal;
   a second conductive path for receiving an induced signal through electromagnetic coupling of the first conductive path and the second conductive path; and
   a processor circuit configured to control deployment of an airbag in response to a comparison of the induced signal to a predetermined signal, and an airbag deployment door, wherein at least a portion of one of the first conductive path and the second conductive path are located on the airbag deployment door.

2. The airbag deployment safety device of claim 1 wherein at least a portion of one of the first conductive path and the second conductive path are located on a trim panel.

3. The airbag deployment safety device of claim 2 wherein the trim panel comprises a substrate; and
   at least a portion of one of the first conductive path and the second conductive path are located on the substrate.

4. The airbag deployment safety device of claim 3 wherein the trim panel further comprises a skin at least partially covering the substrate; and
   at least a portion of one of the first conductive path and the second conductive path are located on either the skin or the substrate, or at a location in between.

5. The airbag deployment safety device of claim 4 wherein the trim panel further comprises a foam located between the skin and the substrate; and
   at least a portion of one of the first conductive path and the second conductive path are at least partially surrounded by the foam.

6. The airbag deployment safety device of claim 2 wherein the trim panel comprises a skin; and
   at least a portion of one of the first conductive path and the second conductive path are located in the skin.

7. The airbag deployment safety device of claim 2 wherein the trim panel comprises a skin; and
   the skin comprises at least a portion of one of the first conductive path and the second conductive path.

8. The airbag deployment safety device of claim 7 wherein the skin comprises at least a portion of the first conductive path and the second conductive path comprises an electrically conductive polymer.

9. The airbag deployment safety device of claim 2 wherein the trim panel comprises a substrate; and
   the substrate comprises at least a portion of one of the first conductive path and the second conductive path.

10. The airbag deployment safety device of claim 2 wherein the trim panel comprises an instrument panel.

11. The airbag deployment safety device of claim 1 wherein at least a portion of the first conductive path and second conductive path are laterally displaced and substantially parallel to one another along at least a portion of their respective lengths.

12. The airbag deployment safety device of claim 1 wherein at least a portion of one of the first conductive path and the second conductive path are adjacent a boundary of an airbag deployment door.

13. The airbag deployment safety device of claim 1 wherein at least a portion of the first conductive path and second conductive path are separated by a boundary of an airbag deployment door.

14. The airbag deployment safety device of claim 1 wherein at least a portion of one of the first conductive path and the second conductive path form a serpentine pattern.

15. The airbag deployment safety device of claim 1 wherein at least a portion of one of the first conductive path and the second conductive path comprise a flat conductor.

16. The airbag deployment safety device of claim 1 wherein at least a portion of one of the first conductive path and the second conductive path comprise a flexible printed circuit.

17. A method of controlling the deployment of an airbag comprising:
   providing an input signal to a first conductive path;
   receiving an induced signal at a second conductive path through electromagnetic coupling of the first conductive path and the second conductive path;
   providing a processor circuit configured to control deployment of an airbag in response to a comparison of the induced signal to a predetermined signal;
   comparing the induced signal with a predetermined signal; and
   controlling deployment of the airbag in response to the comparison of the induced signal to the predetermined signal.

18. The method of claim 17 wherein:
   the predetermined signal comprises a range of predetermined signals having an upper limit and a lower limit; and
   the step of controlling deployment of the airbag in response to the comparison of the induced signal to the predetermined signal further comprises:
      permitting deployment of the airbag in response to the comparison of the induced signal to the predetermined signal when the induced signal is within the range of predetermined signals; and
      preventing deployment of the airbag in response to the comparison of the induced signal to the predetermined signal when the induced signal is outside the range of predetermined signals.

19. The method of claim 17 wherein at least a portion of one of the first conductive path and the second conductive path are located on an airbag deployment door.

20. The method of claim 17 wherein at least a portion of one of the first conductive path and the second conductive path are located on a trim panel.

21. The method of claim 20 wherein the trim panel comprises an instrument panel.

22. The method of claim 20 wherein the trim panel comprises an air bag deployment door.

23. The method of claim 17 an electromagnetic field overlies at least a portion of an outer surface of an airbag deployment door.

24. A trim panel for a motor vehicle comprising:

a first conductive path for receiving an input signal;

a second conductive path for receiving an induced signal through electromagnetic coupling of the first conductive path and the second conductive path; and an airbag deployment door.

25. An airbag deployment door comprising:

at least a portion of one of a first conductive path and a second conductive path, the first conductive path for receiving an input signal and the second conductive path for receiving an induced signal through electromagnetic coupling of the first conductive path and the second conductive path.

26. An airbag deployment door having an outer surface, an electromagnetic field overlying at least a portion of the outer surface of the airbag deployment door, the electromagnetic field configured to control deployment of an airbag.

* * * * *